US005919362A

United States Patent [19]

Barnes et al.

[11] Patent Number: 5,919,362

[45] Date of Patent: Jul. 6, 1999

[54] EXPANDABLE ENCAPSULATED FILTER CARTRIDGE ASSEMBLY

[75] Inventors: Robert G. Barnes, Meriden; William Contaxis, III, Milford; Bruce G. Taylor, Kensington, all of Conn.

[73] Assignee: Cuno, Inc., Meriden, Conn.

[21] Appl. No.: 08/848,145

[22] Filed: Apr. 28, 1997

[51] Int. Cl.[6] .......... B01D 25/00

[52] U.S. Cl. .......... 210/232; 210/440; 210/441; 210/444

[58] Field of Search .......... 210/232, 437, 210/440, 441, 444

[56] References Cited

U.S. PATENT DOCUMENTS

| | | | |
|---|---|---|---|
| 1,688,326 | 10/1928 | Boulade . | |
| 2,063,086 | 12/1936 | Fitz Gerald . | |
| 2,858,026 | 10/1958 | Lorimer . | |
| 3,037,634 | 6/1962 | Mills . | |
| 3,047,370 | 7/1962 | Avtges et al. . | |
| 3,308,957 | 3/1967 | Klein . | |
| 3,310,176 | 3/1967 | Ziherl et al. . | |
| 3,684,100 | 8/1972 | Close . | |
| 3,755,994 | 9/1973 | Bidiwala . | |
| 3,761,408 | 9/1973 | Lee . | |
| 3,950,251 | 4/1976 | Hiller . | |
| 4,108,775 | 8/1978 | Wilkes et al. | 210/440 |
| 4,126,559 | 11/1978 | Cooper . | |
| 4,711,717 | 12/1987 | Wolf . | |
| 4,806,240 | 2/1989 | Giordano et al. . | |
| 4,818,396 | 4/1989 | Wolf . | |
| 4,836,925 | 6/1989 | Wolf . | |
| 4,842,737 | 6/1989 | Reed | 210/448 |
| 4,877,521 | 10/1989 | Petrucci et al. . | |
| 4,882,051 | 11/1989 | Itoh . | |
| 4,915,831 | 4/1990 | Taylor . | |
| 5,039,410 | 8/1991 | Gershenson . | |
| 5,043,068 | 8/1991 | Karbachsch et al. | 210/458 |
| 5,128,034 | 7/1992 | Kool . | |
| 5,171,430 | 12/1992 | Beach et al. | 210/444 |
| 5,230,812 | 7/1993 | Williams . | |
| 5,354,464 | 10/1994 | Slovak et al. . | |
| 5,445,734 | 8/1995 | Chen . | |

FOREIGN PATENT DOCUMENTS

| | | |
|---|---|---|
| 548669 | 11/1957 | Canada . |
| 38 33 134 | 4/1990 | Germany . |
| 577449 | 5/1944 | United Kingdom . |

OTHER PUBLICATIONS

CTG–Klean Filter Systems, CUNO, Incorporated, 1995.

*Primary Examiner*—Jay H. Woo
*Assistant Examiner*—Betsey J. Morrison
*Attorney, Agent, or Firm*—Cummings & Lockwood

[57] ABSTRACT

An encapsulated filter cartridge assembly is disclosed which is adapted and configured for reception within an elongated cartridge housing of a filtration system. The filter cartridge assembly includes an elongated filtration element, a connector head positioned adjacent an upper end portion of the filtration element, an outer shell extending axially from the connector head and encapsulating the filtration element, and an expansion joint integrally formed in the outer shell to facilitate expansion of the outer shell within the elongated cartridge housing.

30 Claims, 8 Drawing Sheets

EXPANDABLE ENCAPSULATED FILTER CARTRIDGE ASSEMBLY

BACKGROUND OF THE INVENTION

1. Field of the Invention

The subject invention relates to fluid filtration devices, and more particularly, to an encapsulated fluid filter cartridge assembly including an outer shell having an expansion joint integrally formed therein which is adapted and configured to facilitate the expansion of the shell within a cartridge housing.

2. Background of the Related Art

Filtration systems having filter heads which employ permanent filter housings and replaceable filter cartridges are well known in the art and have been employed for many years to filter contaminated fluids. An early example of this type of system is disclosed in U.S. Pat. No. 2,858,026 to Lorimer. In such a system, the filter housing serves both as a pressure vessel to support the filter cartridge and a sump or bowl to receive contaminated fluid to be filtered. Consequently, when the filter cartridge is removed from the filter housing after a period of prolonged use, the housing remains contaminated.

Those skilled in the art soon recognized the need to maintain the sterility of the filter housing and provided practical solutions to the problem, as disclosed, for example, in U.S. Pat. No. 3,648,100 to Close. The Close patent describes a system that includes a disposable filter cartridge consisting of a filter element encapsulated within a thin plastic shell and a metal housing that serves solely as a pressure vessel to support the filter cartridge. In use, contaminated fluid only flows though the filter cartridge, and the metal housing remains dry and sanitary.

Building upon the teachings of the prior art, and particularly, the teachings of the Close patent, the subject invention provides an encapsulated filter cartridge designed as a replacement cartridge for a filtration system of the type having a filter head that is unusually shaped and requires a fairly complex and uniquely designed cartridge to mate therewith. More particularly, the novel filter cartridge of the subject invention is configured to accommodate dimensional and geometric variations that often exist between mating components of a complex fluid filtration system. Furthermore, it is envisioned that the unique construction of the filter cartridge of the subject invention will facilitate and enable its employment as a relatively standardized replacement cartridge for a variety of filtration systems currently available in the marketplace.

SUMMARY OF THE INVENTION

The subject invention is directed to a disposable filter cartridge assembly which is adapted and configured for reception within an elongated cartridge housing and connection to a filter head having a fairly complex construction. In accordance with a preferred embodiment of the subject invention, the filter cartridge assembly is encapsulated so that the cartridge housing will not be exposed to the continuous influx of fluid and will remain free from contamination.

The filter cartridge assembly includes an elongated filtration medium having opposed first and second end portions. A connector head is positioned adjacent the first end portion of the filtration medium and an end cap is positioned adjacent the second end portion of the filtration medium to effectively seal and isolate the two ends. An outer shell extends from the connector head and fully encapsulates the filtration medium and the end cap to form a self-contained thin-walled pressure vessel. Preferably, the connector head is mechanically connected to the outer shell by conventional methods known in the art such as heat or sonic welding. Under normal operating conditions, fluid pressure developed within the encapsulated cartridge assembly generates radial and axial forces which tend to act against the interior of the outer shell and the connector head.

To accommodate the axial forces, an expansion joint is monolithically formed in the outer shell of the cartridge assembly. The expansion joint facilitates the axial expansion of the outer shell relative to the elongated cartridge housing and the filter head, and ultimately prevents separation of the connector head and the cartridge shell as internal operating pressures increase. Preferably, the expansion joint is defined at least in part by an undulated region which extends about the periphery of the outer shell at a location spaced from the connector head. Where the outer shell of the cartridge assembly is generally cylindrical in configuration, the undulated region is defined at least in part by one or more circumferential undulations. In one embodiment of the subject invention, the outer shell of the cartridge assembly may also include a series of axially extending undulations for accommodating the radial expansion of the outer shell within the cartridge housing and for reducing surface contact between the outer shell and the interior of the cartridge housing.

In a preferred embodiment of the subject invention, a peripheral or circumferential support ring is disposed about the outer shell between the undulated region and the connector head to support radial forces and hoop stresses generated in the area of the expansion joint by internal pressure. In addition, under operating conditions, the support ring serves to enhance the interengagement of the connector head and the upper end portion of the cartridge shell. It is envisioned that the support ring may be formed separate from, or integral with the outer shell of the cartridge assembly.

In a preferred embodiment of the subject invention, the filtration medium is defined by a pleated filter having an axial bore extending therethrough which defines a fluid flow path, and the connector head includes an inlet flow port and outlet flow ports. An inlet flow tube extends through the axial bore of the pleated filter from the inlet flow port to the end cap to direct fluid into the outer shell. In operation, fluid passes radially inwardly through the pleated filter into the axial bore and exits the cartridge assembly through the outlet port. Alternative filtration media and flow patterns therefor may be employed.

The outer shell of the encapsulated cartridge assembly is preferably constructed of a substantially rigid plastic material selected from the group of materials consisting of polyethylene, polypropylene, polyester, polyvinyl chloride and polytetrafluorethylene, and it may be formed by conventional methods such as blow molding or injection molding. In contrast, to the outer shell of the cartridge assembly, the cartridge housing is generally a deep drawn or impact extruded metal canister.

Further features of the encapsulated filter cartridge of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to construct and use the axially extensible filter cartridge described herein, preferred embodiments of the device will be described in detail hereinbelow with reference to the drawings wherein.

DETAILED DESCRIPTION OF THE PREFERRED EMBODIMENTS

Throughout the specification which follows, the end of the filtration system into which fluid flows will be commonly referred to as the "top" or "upper" end thereof, while the opposed end shall be referred to as the "bottom" or "lower" end. Components and structural elements of the filtration system described herein shall be referred to similarly.

Figure 1:
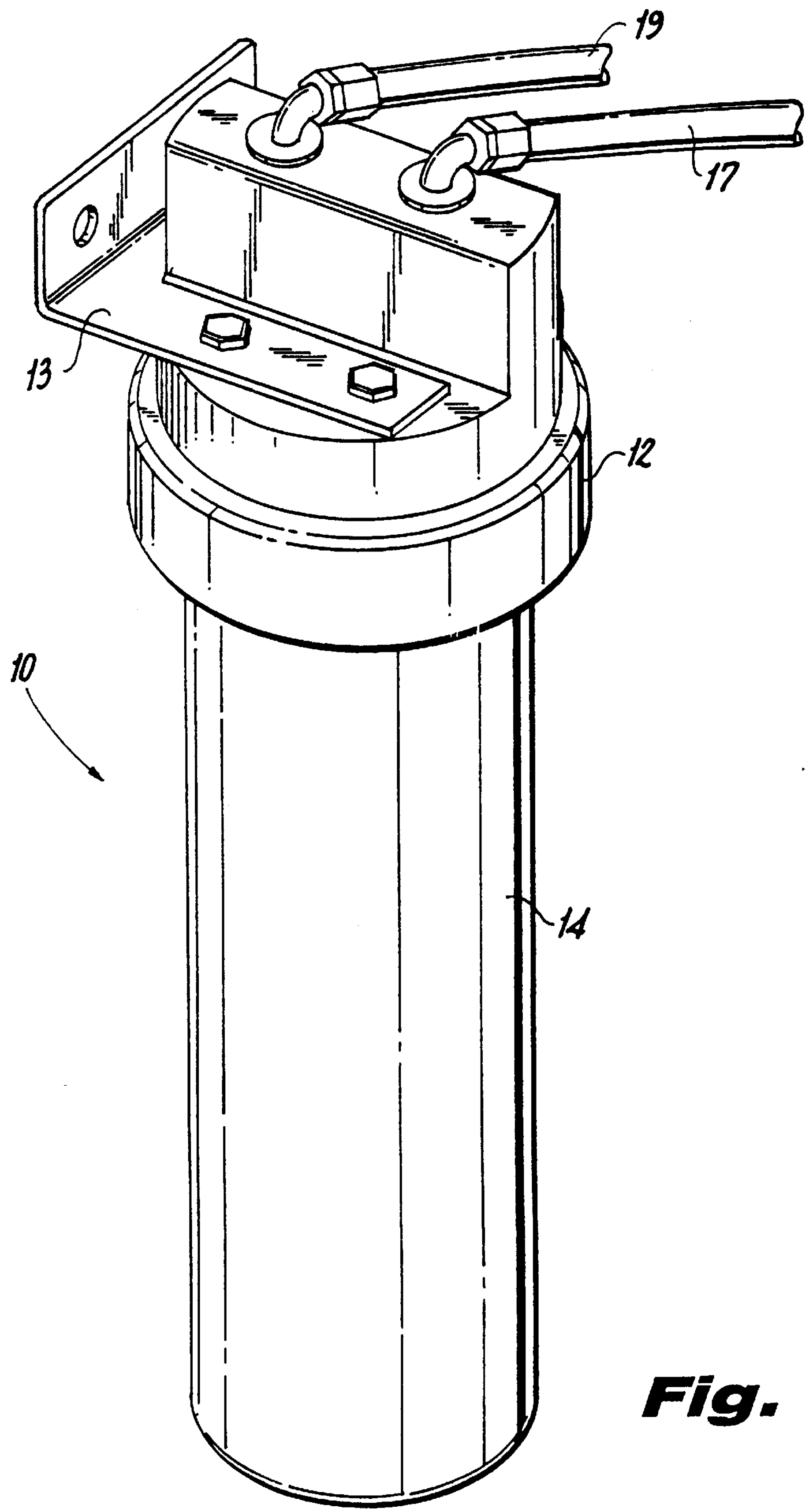
FIG. 1 is a perspective view of a fluid filtration system constructed in accordance with a preferred embodiment of the subject invention.

Referring now in detail to the drawings wherein like reference numerals identify similar structural elements of the subject invention, there is illustrated in FIG. 1 a fluid filtration system constructed in accordance with a preferred embodiment of the subject invention and designated generally by reference numeral 10. Filtration system 10 includes a permanent filter head 12 configured for attachment to a supporting structure by way of a bracket 13 or similar type of connective device, and a reusable detachable canister-like cartridge housing 14.

Figure 2:
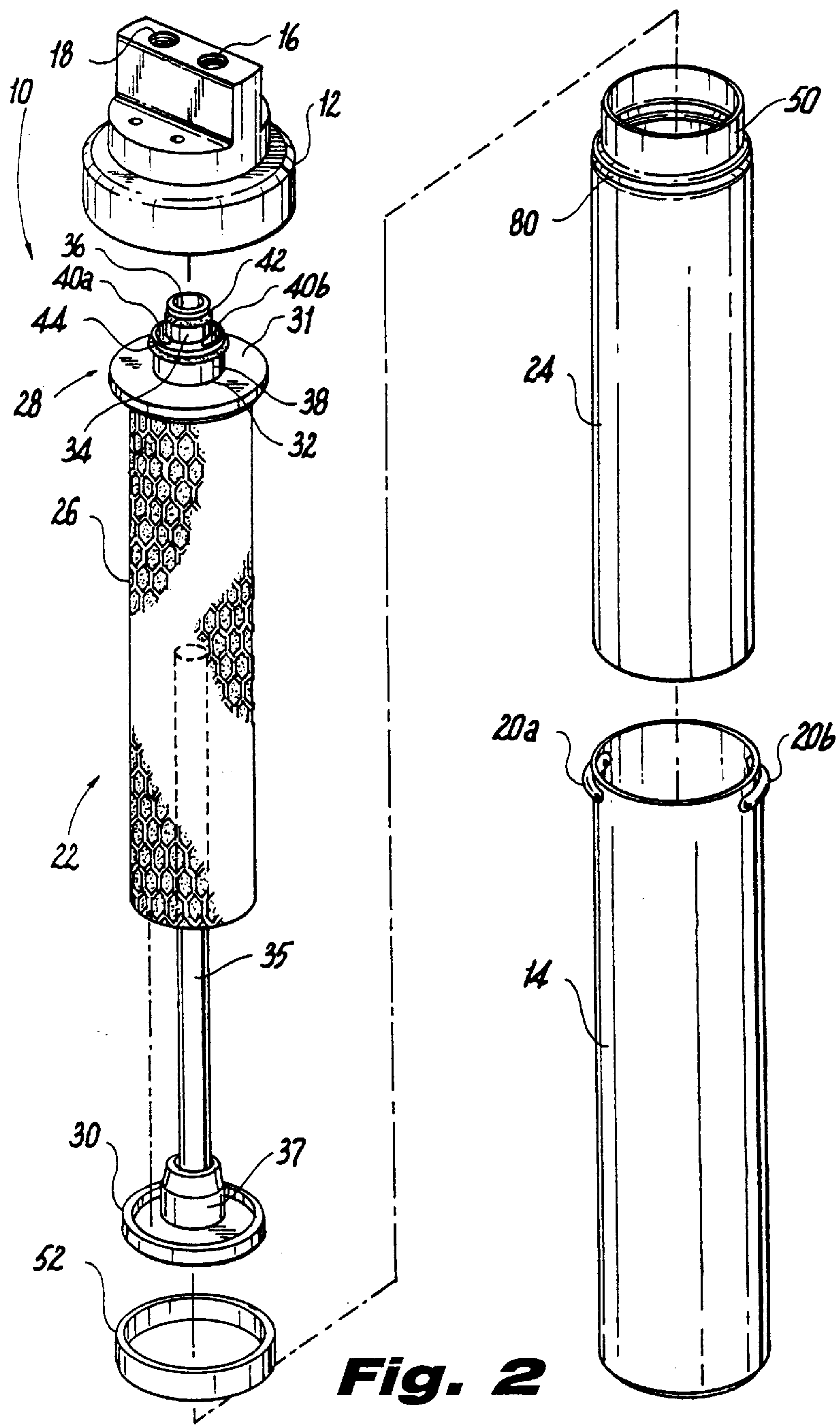
FIG. 2 is an exploded perspective view of the fluid filtration system of FIG. 1 with parts separated for ease of illustration.

Referring now to FIG. 2, filter head 12 is preferably integrally constructed from a molded plastic material, such as, for example, an acetal homopolymer material, and has a fairly complex construction that includes, among other features, a fluid inlet port 16 for facilitating connection with a fluid inlet conduit 17 and a fluid outlet port 18 for facilitating connection with a fluid outlet conduit 19. Fluid conduits 17 and 19 typically connect to the filter head 12 by conventional tapered pipe threads and conduct the process fluid to and from the filter housing.

Cartridge housing 14 is preferably formed from a high strength metallic material such as, for example, stainless steel or conventional sheet metal, and includes a pair of diametrically opposed arcuate engagement lugs 20*a* and 20*b* which facilitate the detachable engagement of the housing 14 to the filter head 12. The engagement of lugs 20*a* and 20*b* with filter head 12 will be discussed in greater detail hereinbelow with particular reference to FIG. 5.

With continuing reference to FIG. 2, cartridge housing 14 is dimensioned and configured to house an encapsulated filter cartridge 22 and serve as a supporting pressure vessel therefor. Filter cartridge 22 is advantageously designed as a self-contained wholly disposable unit which primarily functions to prevent the interior of cartridge housing 14 from being continuously exposed to the influx of contaminated fluid during operation. Since filter cartridge 22 is not intended to serve as a pressure vessel during operation of filtration system 10, it includes a cylindrical outer shell 24 of generally thin-walled construction which is preferably formed from a molded thermoplastic material, such as, for example, polyethylene. Other thermoplastic materials are envisioned including, for example, polypropylene, polyester, and polyvinylchloride.

Cartridge shell 24 is open at one end to receive an elongated cylindrical filter element 26 having opposed upper and lower end caps 28 and 30 associated therewith. Upper end cap 28 functions as a cover for cartridge shell 24 and is fastened thereto by conventional means known in the art, such as, for example, spin welding. Alternatively, sonic welding or heat fusion welding may be employed. The upper and lower end caps are preferably bonded to either end of the filter element by hot-melting or potting techniques, and serve to seal to the ends so as to isolate the upstream side of the filter element from the downstream side of the filter element.

Figure 6:
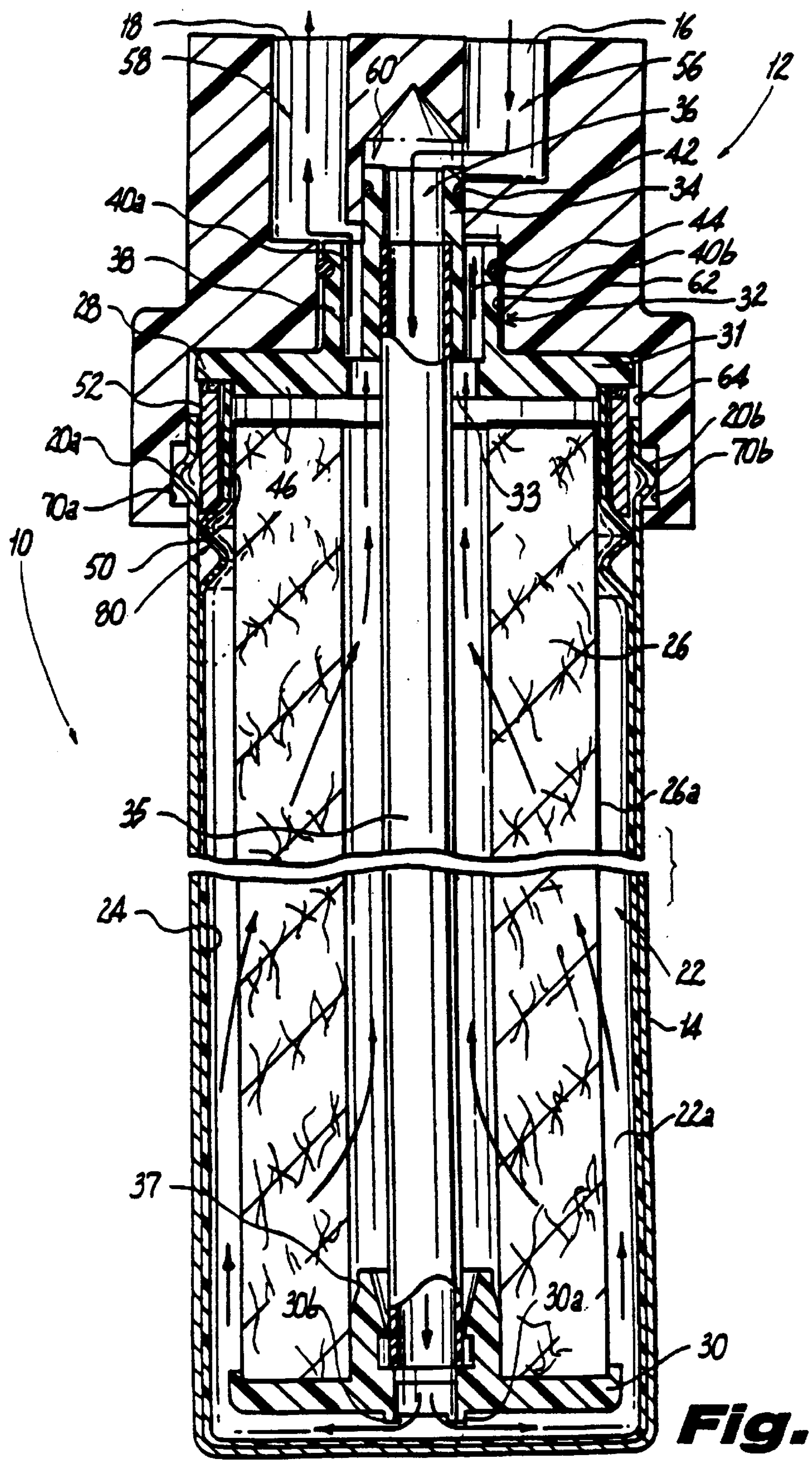
FIG. 6 is an enlarged side elevational view in cross-section of the fluid filtration system of FIG. 1 illustrating the encapsulated filter cartridge in an axially extended position within the cartridge housing with flow lines indicating the course of fluid flowing therethrough.

The lower end cap 30 functions as seat for the lower end portion of filter element 26 and serves to support the lower end of the filter element above from the bottom surface of cartridge shell 24 during operation. More particularly, as best seen in FIG. 6, an axial stand-off flange 30*b* projects downwardly from the bottom surface of lower end cap 30 for maintaining sufficient spacing between the lower end cap and the bottom surface of the cartridge shell to permit the unobstructed flow of contaminated fluid into the interior of filter cartridge 22. The encapsulation of the filter element and its associated flow passages advantageously minimizes contamination of cartridge housing 14 during replacement of a spent filter cartridge.

It is envisioned that filter element 26 may comprise a pleated filter element constructed of one or more layers of filtration media arranged in a generally cylindrical manner, or a sediment filter element constructed of cellulose fibers arranged to form a porous, rigid cylindrical structure. Those having ordinary skill in the art to which the subject invention appertains will readily appreciate that other types of filter elements may also be employed with the filter cartridge of the subject invention. For example, a spiral wound pleated filter element in which adjacent pleats are arranged in a laid-over state may be employed. Additionally, the filter media employed may contain performance enhancing components, such as, for example, fine particulates, charge modifiers, and/or anti-microbial agents.

With continuing reference to FIG. 2, an elongated axial conduit tube 35 extends through a central bore of the filter element (see FIG. 6), from the upper end cap 28 to the lower end cap 30 to conduct contaminated fluid from the inlet port 16 of filter head 12 into filter cartridge 22. The lower end cap 30 is formed with an upstanding reception cup 37 which is dimensioned and configured to receive and securely engage a lower end portion of axial conduit tube 35.

Referring to FIG. 6, the upper end cap 28 includes an annular body portion 31 and an integrally formed upstanding head connector 32 configured to connect or mate the filter cartridge 22 with filter head 12. A central bore 33 is formed in body portion 31 for accommodating fluid flow, as well as the upper end portion of axial conduit tube 35. Head connector 32 includes an upper cylindrical connector portion 34 having an axial inlet port 36 for facilitating the ingress of contaminated fluid into filter cartridge 22 from filter head 12. Axial inlet port 36 is in fluid communication with the axial conduit 35 that extends through the interior of filter element 26. Head connector 32 also includes a lower cylindrical connector portion 38 having a pair of diametrically opposed radially disposed outlet ports **40*a* and 40*b* for facilitating the egress of filtered fluid from filter cartridge 22 into filter head 12. An upper clastomeric O-ring 42 is positioned on the upper connector portion 34 for sealing the upper connector portion within the filter head 12, and a lower elastomeric O-ring 44 is positioned on the lower connector portion for sealing the lower connector portion within filter head 12, as best seen in FIG. 5**.

Figure 3:
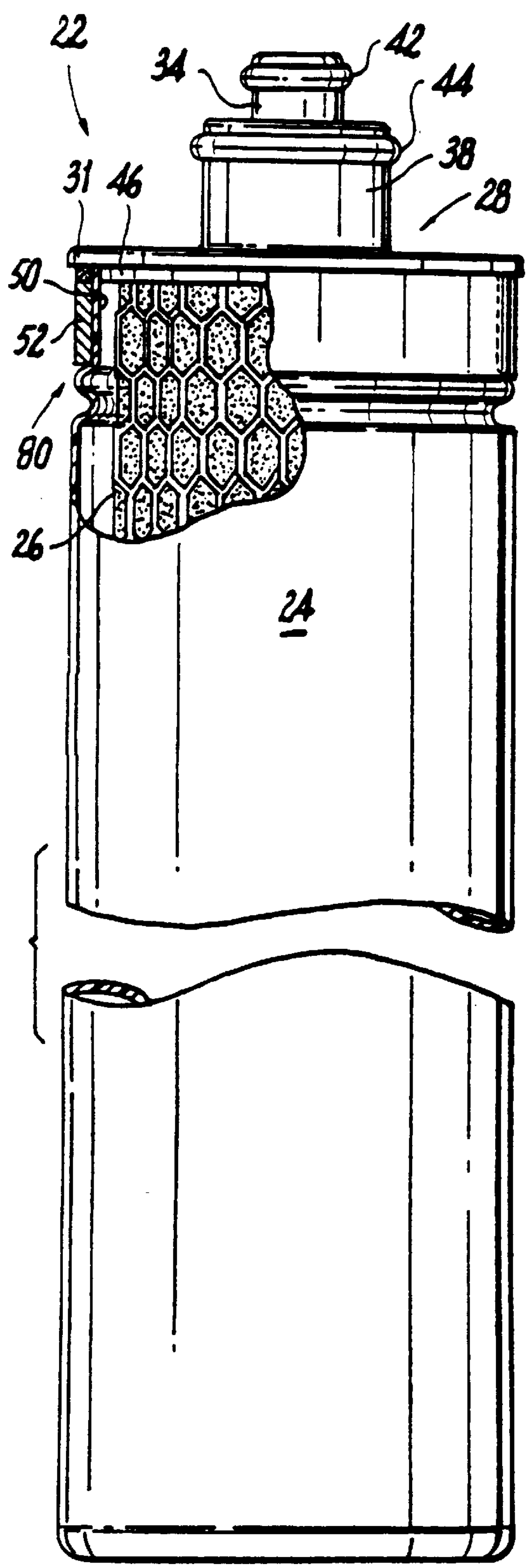
FIG. 3 is a side elevational view in partial cross-section of the encapsulated filter cartridge of the subject invention with a separable support ring disposed above the expansion joint thereof.

Referring now to FIG. 3, in conjunction with FIG. 2, the thin-walled cylindrical shell 24 of filter cartridge 22 includes an upper wall portion 50 of slightly reduced diameter with respect to the remainder of the cartridge shell. The reduced diameter of upper wall portion 50 enables proper securement of the upper end of cartridge shell 24 to the engagement flange 46 which depends from the body portion 31 of upper end cap 28. As noted hereinabove, the securement of the reduced upper wall portion 50 and engagement flange 46 may be accomplished by fastening methods commonly known in the art.

Figure 4:
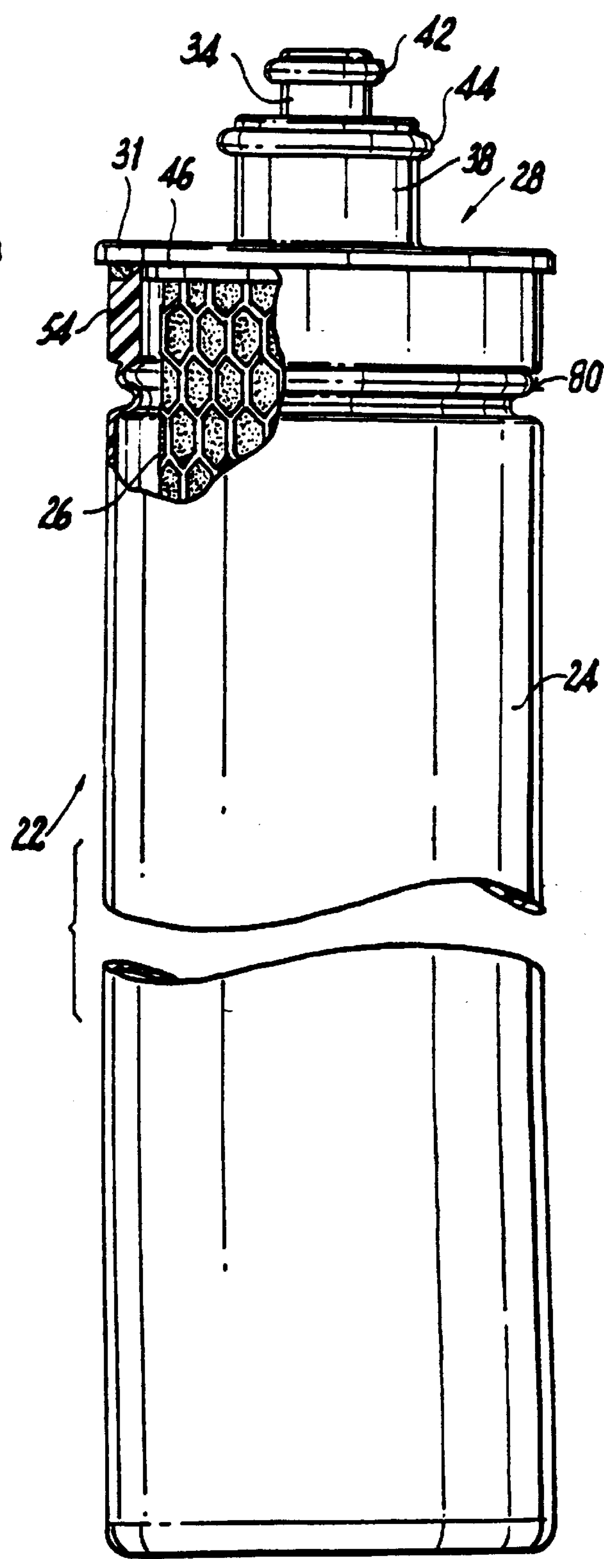
FIG. 4 is a side elevational view in partial cross-section of the encapsulated filter cartridge of the subject invention with an integral support ring disposed above the circumferential expansion joint thereof.

An annular support ring 52 surrounds upper wall portion 50 and assists in maintaining a seal between the thin wall of cartridge shell 24 and the engagement flange 46 of upper end cap 28 when the filtration system 10 is in service. In addition, support ring 52 is dimensioned and configured to withstand radially directed forces and hoop stresses created within filter cartridge 22 by internal operating pressure. As shown, the upper edge of support ring 52 is bonded to the under surface of end cap 28. An alternate embodiment of filter cartridge 22 is illustrated in FIG. 4, wherein the upper wall portion of cartridge shell 24 is monolithically formed with a support ring structure 54 that functions in substantially the same manner as the support ring 52 shown in FIG. 3.

Figure 5:
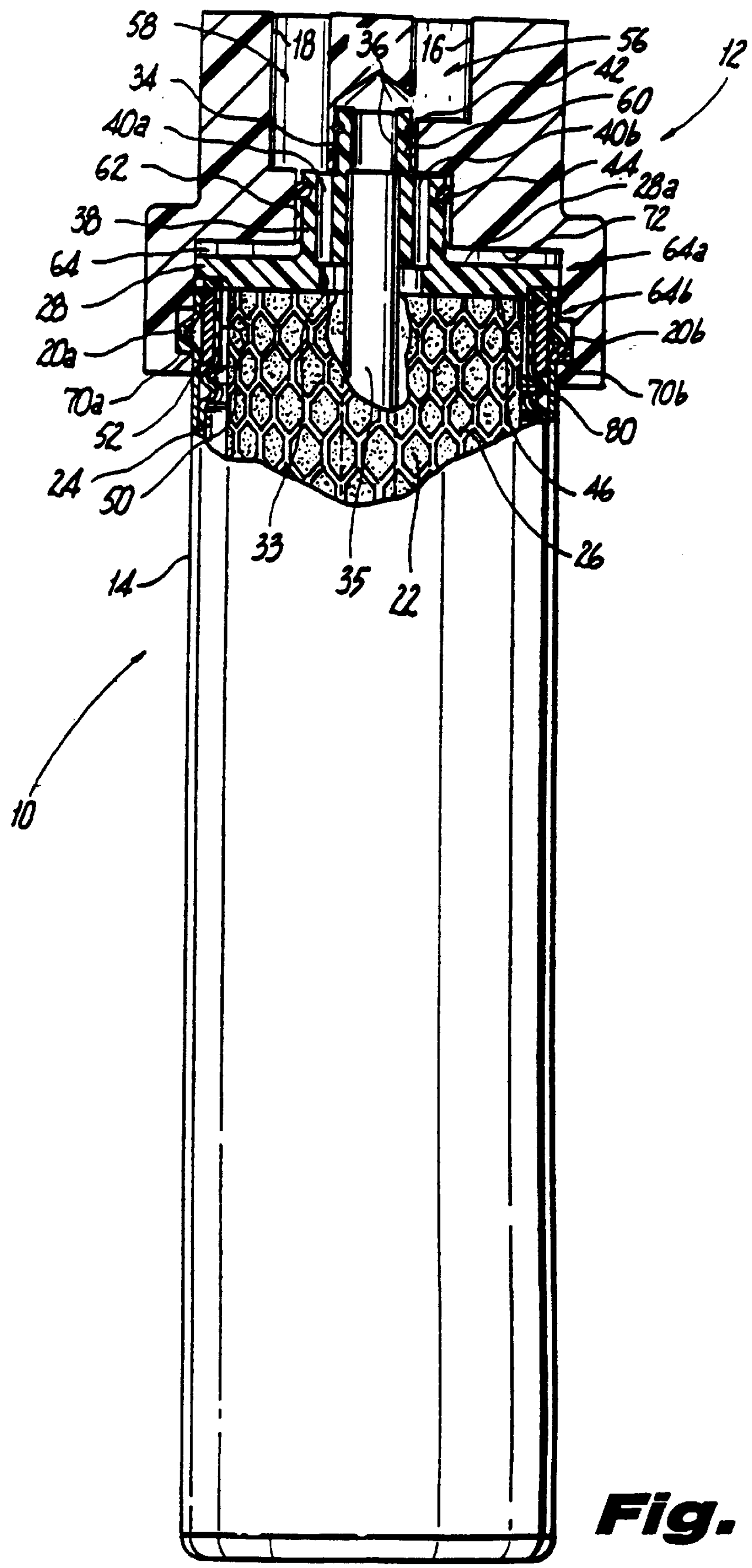
FIG. 5 is a side elevational view in partial cross-section of the fluid filtration system of FIG. 1 illustrating the encapsulated filter cartridge disposed within the cartridge housing and connected to the filter head.

Referring now to FIG. 5, the interior of filter head 12, which, as noted hereinabove, is fairly complex in design, includes axially spaced apart inlet and outlet fluid passages 56 and 58 which extend from inlet and outlet ports 16 and 18, respectively, along with upper, intermediate and lower coaxial connector head reception bores 60, 62 and 64, respectively. Inlet conduit 56 communicates directly with upper reception bore 60 and outlet conduit 58 communicates directly with intermediate reception bore 62. Upper reception bore 60 is dimensioned and configured to receive the upper cylindrical connector portion 34 of head connector 32 so that axial inlet port 36 is in fluid communication with inlet port 16. Intermediate reception bore 62 is dimensioned and configured to receive the lower cylindrical connector portion 38 of head connector 32 so that the outlet ports **40*a* and 40*b* are in fluid communication with outlet port 18**.

When the upper connector portion 34 of head connector 32 is engaged in or mated with the upper reception bore 60, the upper O-ring 42 serves to sealingly isolate the axial inlet port 36 from outlet ports **40*a* and 40*b*, thus advantageously preventing leakage of contaminated fluid into the outlet fluid passage 58. Similarly, when the lower connector portion 38 of head connector 32 is engaged in the intermediate reception bore 62, the lower O-ring 44** serves to advantageously prevent filtered fluid from leaking from the intermediate reception bore.

With continuing reference to FIG. 5, the lower reception bore 64 of filter head 12 includes an upper region **64*a* which is dimensioned and configured to receive the main body portion of upper end cap 28, and a lower region 64*b* which is dimensioned and configured to receive the upper end portion of cartridge housing 14. More particularly, a pair of diametrically disposed arcuate reception grooves 70*a* and 70*b* are defined in the interior wall of lower region 64*b* for receiving the diametrically opposed arcuate lugs 20*a* and 20*b* integrally formed in the upper end portion of cartridge housing 14**.

As illustrated in FIG. 5, prior to operation, when cartridge housing 14 and filter cartridge 22 are properly engaged or mated to filter head 12, a spatial gap exists between the uppermost surface **28*a* of end cap 28 and an upper interior surface 72 of the upper region 64*a* of reception bore 64, as well as between the top of lower connector portion 38 and the upper interior surfaces of intermediate reception bore 62. These spatial gaps or dimensional inconsistencies often result from variations or differences in the manufacturing techniques of the filter head 12, the filter cartridge 22 and cartridge housing 14**. Moreover, as a consequence of the variations in the manufacturing techniques of these components, the spatial gaps may not even be equal from one system to another.

Because of the existence of these spatial gaps, when filtration system 10 is put into service, operating pressure within filter cartridge 22 will necessarily generate axial forces which tend to urge the upper end cap 28 in an upward direction, toward the interior surface 72 of reception bore 64 and the cartridge shell 24 in a downward direction toward the bottom end of the cartridge housing 14. To accommodate this tendency, the thin-walled outer shell 24 of filter cartridge 22 is advantageously provided with a monolithically formed expansion joint 80 defined, at least in part, by an undulated region extending substantially about the circumference of the outer shell, slightly below the reduced upper wall portion 50 of filter cartridge 22. Under normal operating conditions, expansion joint 80 facilitates the axial extension of the outer shell 24 of filter cartridge 22 within cartridge housing 14, allowing the upper end cap 28 to move into and occupy the existing gap, as illustrated in FIG. 6. In the absence of such an accommodation, it is likely that the upper end cap 28 would separate from the top of cartridge shell 24, causing an outflow of contaminated fluid into filter housing 14 and an overall system failure. Those skilled in the art will readily appreciate that the configuration, orientations and/or number of undulations formed in the outer shell of the filter cartridge can vary, as will be discussed in greater detail herein below with reference to FIGS. 7–9.

Referring now in detail to FIG. 6, wherein a series of indicator arrows are provided to illustrate the direction of fluid flow through filtration system 10, in operation, contaminated fluid from inlet conduit 17 (FIG. 1) enters filter head 12 through inlet passage 56 and flows into the axial inlet port 36 of head connector 32. The contaminated fluid then flows into the axial conduit tube 35 extending through the central bore 26*a* of filter element 26, and out from the axial bore 30*a* of lower end cap 30, whereupon the contaminated fluid fills the interior cavity 22*a* of filter cartridge 22, which acts as a sump or bowl for the fluid. Contaminated fluid entering interior cavity 22*a* is drawn radially inwardly through the generally cylindrical body of filter element 26 and into the central bore 26*a* thereof. As the fluid is drawn through the filter element, contaminates are removed therefrom and deposited in the filter media. Accordingly, only filtered fluid enters the central bore 26*a* of filter element 26. From the central bore 26*a* of filter element 26, the filtered fluid flows into the central bore 33 of upper end cap 28, out of the radially disposed outlet ports 40*a* and 40*b* of head connector 32, and egresses from the filter head 12 into outlet conduit 19 (FIG. 1) via outlet passage 58. It will be readily appreciated by those skilled in the art that the direction of fluid flow within the cartridge assembly of the subject invention can vary depending upon the type and configuration of the filter media utilized therein, as well as the filtration system with which the cartridge assembly is employed.

Figure 7:
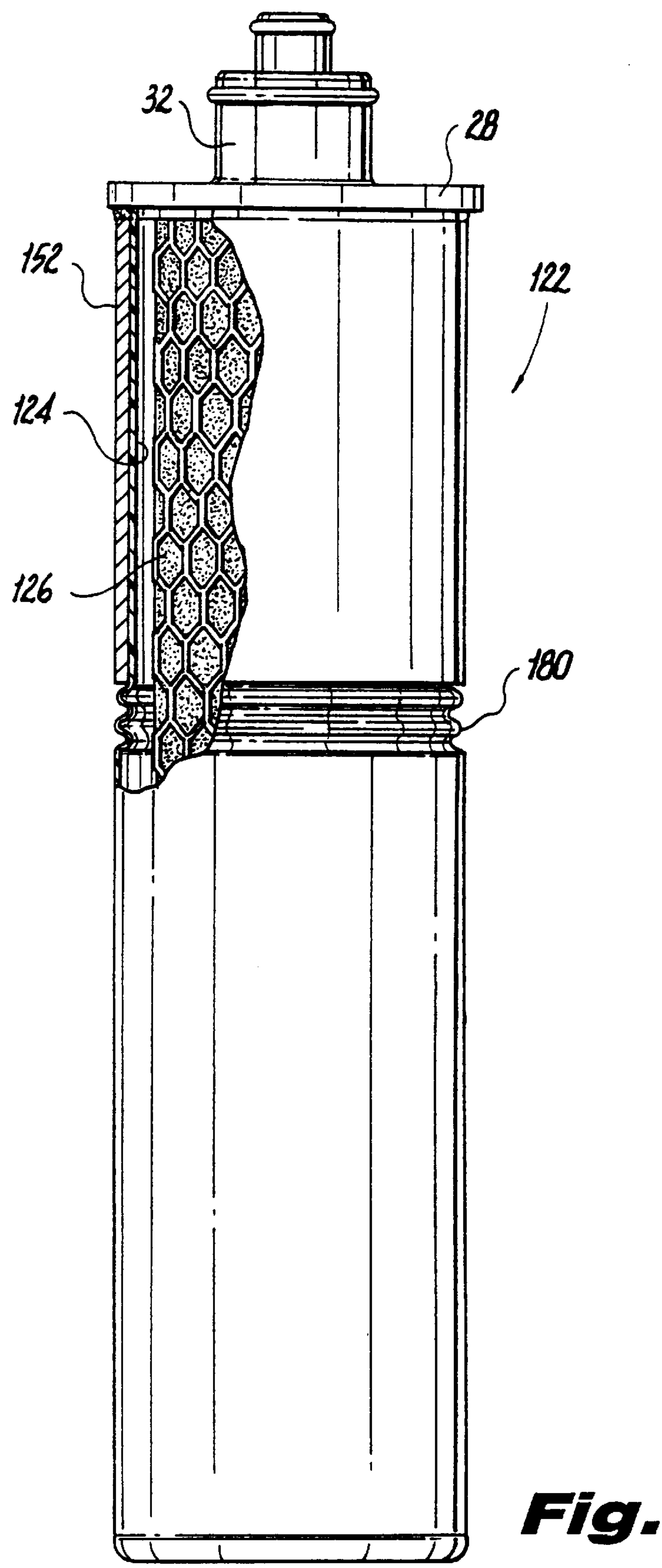
FIG. 7 is another embodiment of an encapsulated filter cartridge constructed in accordance with the subject invention which includes a series of circumferential expansion joints located in a medial region thereof.

Referring now to FIG. 7, there is illustrated another encapsulated filter cartridge constructed in accordance with a preferred embodiment of the subject invention and designated generally by reference numeral 122. Filter cartridge 122 is substantially similar to filter cartridge 22 in that it includes an identical cylindrical filter element 126 with the same associated fluid passages. Filter cartridge 122 differs however in that it includes a monolithically formed expansion joint 180 having a plurality of undulations extending circumferentially about the thin-walled cartridge shell 124 in a medial region thereof. Additionally, cartridge shell 124 has a greater reduced diameter portion 150 than that of cartridge shell 24, and a correspondingly larger support ring 152 for withstanding hoop stress.

Figure 8:
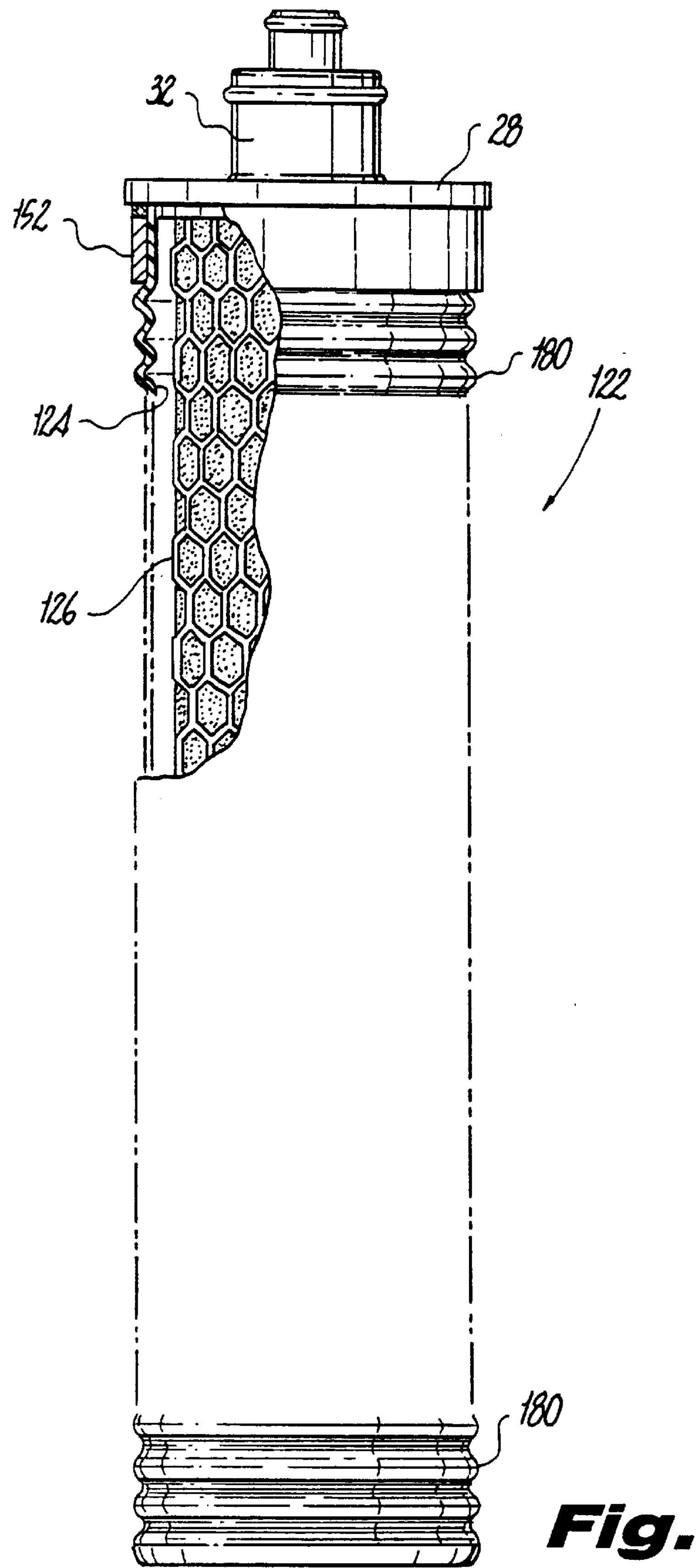
FIG. 8 is another embodiment of an encapsulated filter cartridge constructed in accordance with the subject invention which includes a series of circumferential expansion joints located along a substantial portion of its length.

Those skilled in the art will appreciate that a filter cartridge, depending upon service demands, may remain in place for a significant period of time, and thus the outer surface of the cartridge shell, being in an expanded state under operating pressures, can adhere to the inner surface of the housing making removal difficult at the time of filter cartridge replacement. To overcome this condition of adhesion, an alternative embodiment of the filter cartridge of the subject invention, which is illustrated in FIG. 8, is provided with an expansion joint in which the undulations 180 extend along a significant portion of the length of the outer cartridge shell 124. This configuration effectively reduces the area of contact between the outer surface of the cartridge shell and the inner surface of metallic housing, thereby providing a reduction in the degree of adhesion that may develop between the two surfaces.

Figure 9:
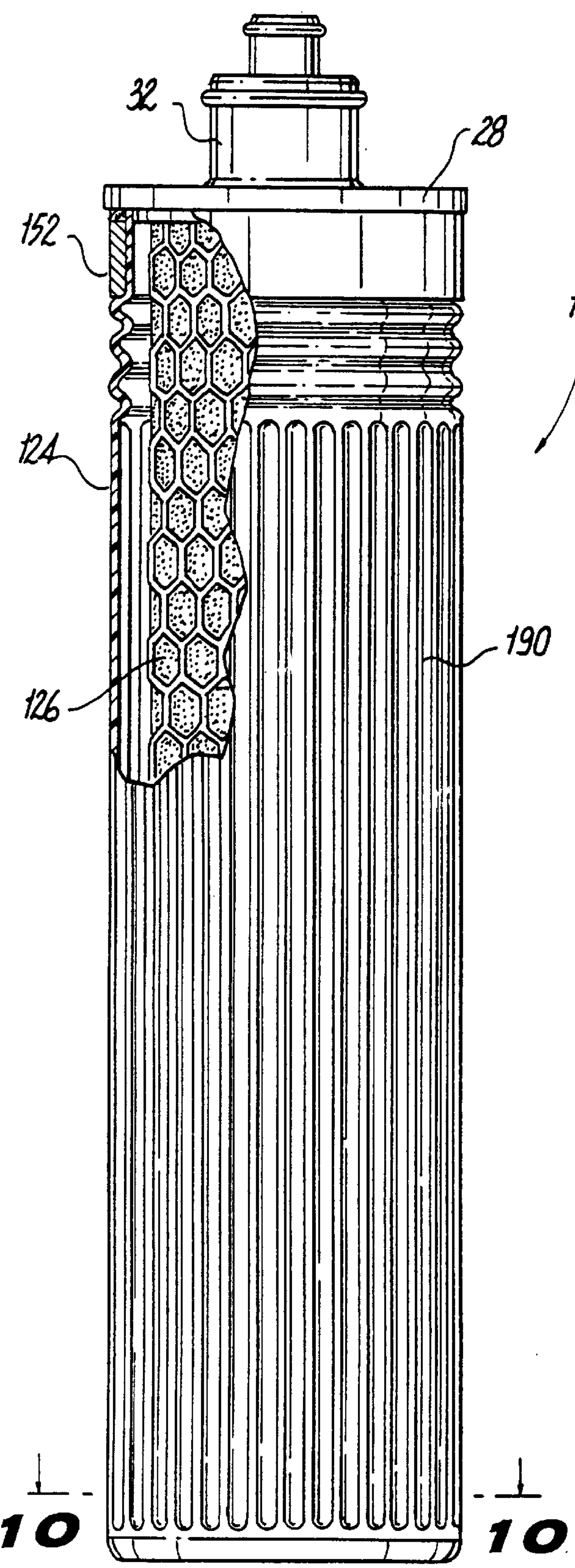
FIG. 9 is yet another embodiment of an encapsulated filter cartridge constructed in accordance with the subject invention which includes a series of circumferential expansion joints and a series of axial expansion joints.
Figure 10:
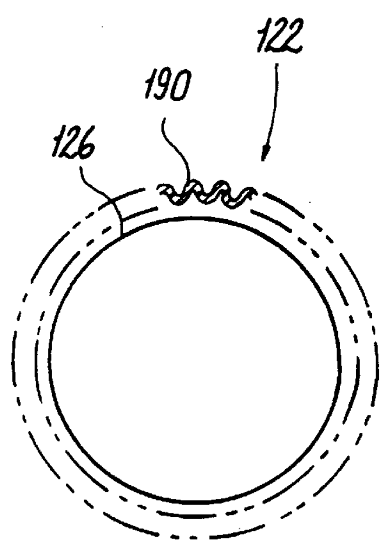
FIG. 10 a cross-sectional view taken along line 10—10 of FIG. 9 illustrating the geometric configuration of the axially extending undulations.

Referring to FIGS. 9 and 10, there is illustrated yet another embodiment of the filter cartridge of the subject invention in which monolithically formed undulations 190 extend in an axial direction, below the circumferential expansion joint 180 of the cartridge shell. In this embodiment, the axial undulations 190 serve to accommodate radial expansion of the cartridge shell 124, and reduce the degree of adhesion between the outer surface of the cartridge shell 124 and the inner surface of the cartridge housing within which it is employed, which may result from internal operating pressures during service.

Although the axially extensible filter cartridge assembly of the subject invention and the filtration system in general have been described with respect to a preferred embodiment, it is apparent that modifications and changes can be made thereto without departing from the spirit and scope of the invention as defined by the appended claims.

What is claimed is:

1. An encapsulated filter cartridge assembly adapted and configured for reception within an elongated cartridge housing of a filtration system, said filter cartridge assembly comprising:

a) an elongated filtration medium;

b) a connector head positioned adjacent an upper end portion of said filtration medium;

c) an outer shell extending axially from said connector head and encapsulating said filtration medium; and d) an expansion joint monolithically formed in said outer shell to facilitate expansion of said outer shell within said elongated cartridge housing.

2. A cartridge assembly as recited in claim 1, wherein said expansion joint is defined at least in part by an undulated region.

3. A cartridge assembly as recited in claim 2, wherein said undulated region includes a plurality of circumferentially disposed undulations to facilitate axial expansion of said outer shell within said elongated cartridge housing.

4. A cartridge assembly as recited in claim 2, wherein said undulated region includes a plurality of axially disposed undulations to facilitate radial expansion of said outer shell within said elongated cartridge housing.

5. A cartridge assembly as recited in claim 3, further comprising a plurality of axially disposed undulations adjacent said plurality of circumferentially disposed undulations to facilitate radial expansion of said outer shell within said elongated cartridge housing.

6. A cartridge assembly as recited in claim 1, wherein said filtration medium includes a lower end portion opposite said upper end portion, and an end cap is positioned adjacent said lower end portion, whereby said outer shell encapsulates said filtration medium and said end cap.

7. A cartridge assembly as recited in claim 1, wherein said filtration medium is defined at least in part by a pleated filter element.

8. An encapsulated filter cartridge assembly adapted and configured for reception within an elongated cartridge housing of a filtration system, said filter cartridge assembly comprising:

a) an elongated filtration element having opposed first and second end portions;

b) a connector head positioned adjacent the first end portion of said filtration element;

c) an end cap positioned adjacent the second end portion of said elongated filtration element;

d) an outer shell extending from said connector head and encapsulating said filtration element and said end cap; and e) an expansion joint monolithically formed in said outer shell to facilitate axial expansion of said outer shell within said elongated cartridge housing.

9. A cartridge assembly as recited in claim 8, wherein said filtration element is defined at least in part by a pleated filter element having an axial bore extending therethrough defining a fluid flow path.

10. A cartridge assembly as recited in claim 9, wherein said connector head includes an inlet flow port and an outlet flow port, and an inlet flow tube extends through said axial bore of said pleated filter element from said inlet flow port to said end cap to direct fluid into said outer shell.

11. A cartridge assembly as recited in claim 8, wherein said outer shell is constructed of a substantially rigid plastic material selected from the group of materials consisting of polyethylene, polypropylene, polyester, polyvinylchloride and polytetrafluorethylene.

12. A cartridge assembly as recited in claim 8, wherein said expansion joint is defined at least in part by an undulated region extending about the periphery of said outer shell.

13. A cartridge assembly as recited in claim 12, wherein said undulated region includes at least a plurality of circumferential undulations spaced from said connector head.

14. A cartridge assembly as recited in claim 13, further comprising a plurality of axially disposed undulations adjacent said plurality of circumferentially disposed undulations to facilitate radial expansion of said outer shell within said elongated cartridge housing.

15. A cartridge assembly as recited in claim 8, further comprising a peripheral support ring disposed about said outer shell between said undulated region and said connector head.

16. A cartridge assembly as recited in claim 15, wherein said support ring is formed separate from said outer shell.

17. A cartridge assembly as recited in claim 8, where said connector head is adapted and configured to sealingly engage said cartridge housing.

18. A fluid filtration system comprising:

a) a cartridge adapter including interlocking means for detachably engaging a cartridge housing;

b) an elongated cartridge housing including means for cooperating with said interlocking means, said cartridge housing being adapted and configured to receive an encapsulated filter cartridge assembly; and c) an encapsulated filter cartridge assembly including:

i) an elongated filtration element;

ii) a connector head positioned adjacent an upper end portion of said filtration element and defining fluid flow ports configured to communicate with said cartridge adapter, said connector head configured to sealingly engage said cartridge housing; and iii) an outer shell extending axially from said connector head and encapsulating said filtration element, said outer shell having an expansion joint monolithically formed therein to facilitate expansion of said outer shell within said elongated cartridge housing.

19. A filtration system as recited in claim 18, wherein said connector head includes an inlet flow port and an outlet flow port for communicating with said cartridge adapter.

20. A cartridge assembly as recited in claim 18, wherein said expansion joint is defined at least in part by an undulated region.

21. A cartridge assembly as recited in claim 20, wherein said undulated region includes a plurality of circumferentially disposed undulations to facilitate axial expansion of said outer shell within said elongated cartridge housing.

22. A cartridge assembly as recited in claim 20, wherein said undulated region includes a plurality of axially disposed undulations to facilitate radial expansion of said outer shell within said elongated cartridge housing.

23. A cartridge assembly as recited in claim 21, further comprising a plurality of axially disposed undulations adjacent said plurality of circumferentially disposed undulations to facilitate radial expansion of said outer shell within said elongated cartridge housing.

24. An improved encapsulated filter cartridge assembly adapted and configured for reception within an elongated cartridge housing of a filtration system and of the type having an elongated filtration medium that operatively cooperates with a connector head that is positioned adjacent an upper portion of the filtration medium and an outer shell that extends axially from the connector head and encapsulates the filtration medium, wherein the improvement comprises an expansion joint monolithically formed in the outer shell to facilitate expansion of the outer shell within the elongated cartridge housing.

25. An improved cartridge assembly as recited in claim 24, wherein said expansion joint is defined at least in part by an undulated region.

26. An improved cartridge assembly as recited in claim 25, wherein said undulated region includes a plurality of circumferentially disposed undulations to facilitate axial expansion of the outer shell within the elongated cartridge housing.

27. An improved cartridge assembly as recited in claim 25, wherein said undulated region includes a plurality of axially disposed undulations to facilitate radial expansion of the outer shell within the elongated cartridge housing.

28. An improved cartridge assembly as recited in claim 26, further comprising a plurality of axially disposed undulations adjacent said plurality of circumferentially disposed undulations to facilitate radial expansion of the outer shell within the elongated cartridge housing.

29. An improved cartridge assembly as recited in claim 24, wherein the filtration medium includes a lower end portion opposite the upper end portion, and an end cap is positioned adjacent said lower end portion, whereby the outer shell encapsulates the filtration medium and said end cap.

30. An improved cartridge assembly as recited in claim 24, wherein the filtration medium is defined at least in part by a pleated filter element.

* * * * *